United States Patent

Schouten et al.

[15] 3,701,981

[45] Oct. 31, 1972

[54] THREE-DIMENSIONAL STORAGE DEVICE COMPRISING MAGNETIC MEMORY ELEMENTS

[72] Inventors: Gerrit Hilbertus Schouten; Nicolaas Bohlmeijer; Hendrik van der Steeg; Marinus Cornelius van der Maarel, all of Hilversum, Netherlands

[73] Assignee: U.S. Philips Corporation, New York, N.Y.

[22] Filed: Oct. 22, 1970

[21] Appl. No.: 82,984

[30] Foreign Application Priority Data

Oct. 31, 1969 Netherlands..............6916401

[52] U.S. Cl...340/174 AC, 340/174 M, 340/174 TB, 340/174 NC

[51] Int. Cl............................G11c 5/02, G11c 11/06

[58] Field of Search.....340/174 M, 174 AC, 174 TB, 340/174 NC

[56] References Cited

UNITED STATES PATENTS

| | | | |
|---|---|---|---|
| 2,917,727 | 12/1959 | Reach, Jr. | 340/174 M |
| 3,329,940 | 7/1967 | Barnes et al. | 340/174 AC |
| 3,208,053 | 9/1965 | Elovic | 340/174 AC |
| 3,537,081 | 10/1970 | Olsson | 340/174 TB |

*Primary Examiner*—Stanley M. Urynowicz, Jr.
*Attorney*—Frank R. Trifari

[57] ABSTRACT

Three-dimensional store in which the x- and/or the y- with the z-conductors are connected in series to one or to two current sources. The internal dissipation of the store is thus reduced and a complete compensation both in waveform and in time of half the write current is obtained by the forbidding current.

A plurality of z-conductors may be used in each plane for reducing the impedance connected to the current source, said z-conductors forming mutual dummies.

8 Claims, 7 Drawing Figures

INVENTORS
GERRIT H. SCHOUTEN
NICOLAAS BOHLMEIJER
HENDRIK VAN DER STEEG
MARINUS C. VAN DER MAAREL
BY
Frank R. Trifari
AGENT INVENTORS
GERRIT H. SCHOUTEN
NICOLAAS BOHLMEIJER
HENDRIK VAN DER STEEG
MARINUS C. VAN DER MAAREL
BY
AGENT INVENTORS
GERRIT H. SCHOUTEN
NICOLAAS BOHLMEIJER
HENDRIK VAN DER STEEG
MARINUS C. VAN DER MAAREL
BY
Frank R. Trifari
AGENT INVENTORS
GERRIT H. SCHOUTEN
NICOLAAS BOHLMEIJER
HENDRIK VAN DER STEEG
MARINUS C. VAN DER MAAREL
BY
AGENT INVENTORS
GERRIT H. SCHOUTEN
NICOLAAS BOHLMEIJER
HENDRIK VAN DER STEEG
MARINUS C. VAN DER MAAREL

BY

Frank R. Trifari

AGENT

INVENTORS
GERRIT H. SCHOUTEN
NICOLAAS BOHLMEIJER
HENDRIK VAN DER STEEG
MARINUS C. VAN DER MAAREL
BY
AGENT

THREE-DIMENSIONAL STORAGE DEVICE COMPRISING MAGNETIC MEMORY ELEMENTS

The invention relates to a three-dimensional storage device comprising magnetic memory elements coupled each with an $x$-, $y$- and $z$-conductor, to which $x$ and $y$ conductors selector switches are added for coupling the $x$- and $y$-conductors with a current source to supply half a write current, which has a value equal to half the current intensity required for writing information in the memory element.

Such storage devices may be employed inter alia in computers and telephone systems. In the known storage devices the $x$-, $y$- and $z$-conductors are connected to separate current sources. They have the disadvantage that due to the high number of current sources the overall internal dissipation is considerable so that the temperature may rise to high values, which requires special precautions for temperature-control.

The invention has for its object to provide a storage device of the type set forth, in which the internal dissipation is materially reduced as compared with the known three-dimensional storage devices.

The storage device embodying the invention is characterized in that the $z$-conductor of each memory element has added to it a switch for connecting in series upon selection of the memory element in accordance with the information to be recorded, the $z$-conductor of said memory element in opposite senses with one of the conductors of the group formed by the $x$- and $y$-conductors of said memory element for passing at a certain value of the information simultaneously with the write current, the write current counteracting inhibit or forbidding current through the $z$-conductor, having a value of half the write current.

In such a storage device no separate current sources are used for feeding current to the $z$-conductors so that the total number of required current sources is low.

An additional advantage of this storage device resides in that the forbidding current through the $z$-conductor coupled with a memory element is the same as the write current through the $x$- or $y$-conductor coupled with said memory element so that a complete compensation of the influence of the current through the $x$- or $y$-conductor on the memory element is always ensured.

Consequently, the control-device of the storage device embodying the invention is simpler than that of known storage devices, since the simultaneous appearance of the forbidding current and the half value of the write current is achieved without the need for taking special steps. Moreover, variations of the forbidding current due to temperature or voltage fluctuations compensate for the corresponding variations of the current through the $x$- or $y$-conductor.

Further advantages of the reduction of the number of current sources reside in that the number of setting members for adjusting the current values and the number of control-members readjusting the current strengths in dependence upon temperature and the number of buffers, formed, for example, by inductors employed for allowing the use of a lower supply voltage can be reduced accordingly.

The invention and its advantages will be described more fully with reference to the embodiments shown in the figures. Corresponding parts in the various Figures are designated by the same references.

In known stores the memory elements are distributed in a plurality of planes. The memory elements of each plane are connected to a common $z$-conductor.

Figure 1:
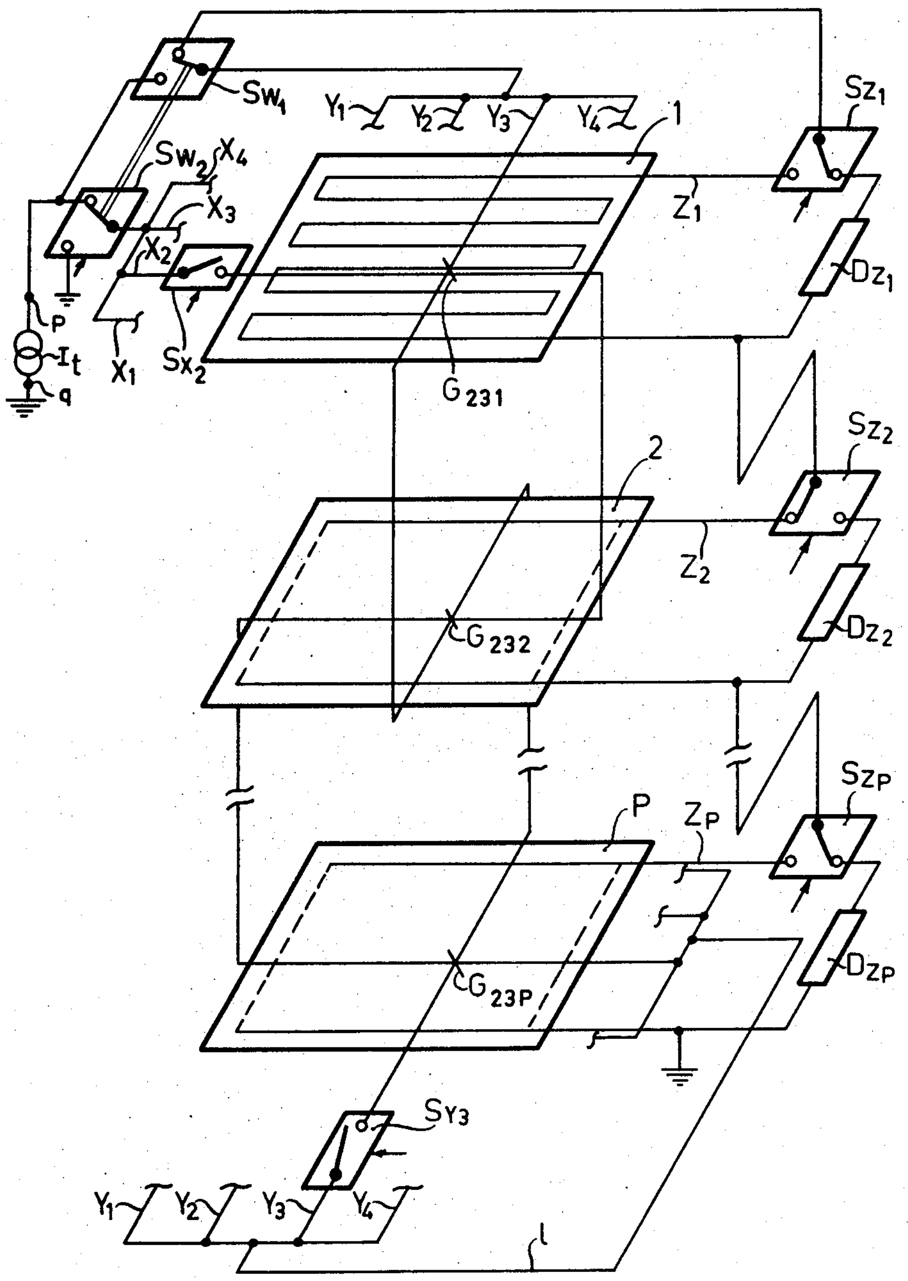
FIGS. 1, 2 and 3 show three-dimensional storage devices embodying the invention.

These $z$-conductors are each connected to an individual current source for passing a forbidding current through those planes in which the response of the memory elements to the write currents has to be forbidden. When the number of planes is high, the number of current sources is also high. These current sources have each a given internal dissipation which results in a high development of heat of all current sources, so that the temperature of the store as a whole is raised accordingly. FIG. 1 shows an embodiment of a three-dimensional storage device in accordance with the invention, which has a markedly lower rest dissipation owing to the use of a single central current source. In this embodiment the store comprises memory elements arranged in $p$ planes, each plane having 16 memory elements ($G_{11} \ldots G_{44}$) formed by magnetic rings having a rectangular hysteresis loop, said elements being arranged in four rows and four columns. The rings of each row are coupled with an $x$-conductor ($x_1$ to $x_4$) and the rings of each column are coupled with an $y$-conductor ($y_1$ to $y_4$). For the sake of clarity the drawing shows in each plane only one memory element $G_{23}$ and the conductors $x_2$ and $y_3$ coupled with said element and a $z$-conductor common in said plane ($z_1 \ldots z_p$), extending parallel to the $x$-conductor. The $x$-and $y$-conductors in the various planes having the same indices are commoned. The commoned $x$- and $y$-conductors include switches. The Figure shows the switch $Sx_2$ included in the $x_2$-conductor and the switch $Sy_3$ included in the $y_3$-conductor. The $x$-conductors are connected to each other at one end and at the other end they are connected to each other and via a conductor 1 to the $y$-conductors connected to each other at their other ends. According to the invention the $z$-conductor of each memory element ($z_1$ to $z_p$) has added to it a switch ($Sz_1$ to $Sz_p$) in order to connect in accordance with the information to be written, the z-conductor of the memory element in series in opposite sense with at least one of the conductors of the group formed by the $x$- and $y$-conductors of said memory element, when this memory element is selected, by closing simultaneously a $Sx$- and a $Sy$-switch. The series combination of the $x$- and/or $y$- and $z$-conductors is coupled with the current source $I_t$ for passing, at a given value of the information simultaneously with the write current, a forbidding current of half the write current counteracting the write current through the z-conductor.

The store furthermore comprises a network $Dz$ added to each $z$-conductor and having the artificial impedance of said $z$-conductor. The network $Dz$, in its simplest form, may be formed by the series combination of a coil and a resistor. The switches $Sz_1 \ldots Sz_p$ added to the individual $z$-conductors are formed by change-over switches, each of them connecting the $z$-conductor or the associated network in series with the $z$-conductor or the associated network of any other plane. The read-write cycle is determined by the change-over switches $Sw_1$ and $Sw_2$.

This storage device operates as follows: By way of example information is written in the memory element $G_{23}$. The switches $Sw_1$ and $Sw_2$ then are in the position shown. The switches $Sz_1 \ldots Sz_p$ occupy, as is shown, such a position that writing in the planes 1 and $p$ is not forbidden. The current source $I_t$ supplies half a write current, during writing in the memory element $G_{23}$, for which purpose the switches $Sx_2$ and $Sy_3$ have to be closed, the strength of said current being chosen so that it is half the strength required for changing over the magnetization to the direction determined by said current, via connecting terminal $p$, switch $Sw_2$, switch $Sx_2$, conductor $x_2$ in the planes 1 to $p$, conductor 1, switch $Sy_3$, conductors $y_3$ in the planes $p$ to 1, switch $Sw_1$, switch $Sz_1$, network $Dz_1$, switch $SZ_2$, conductor $z_2$, . . . switch $Sz_p$, network $Dz_p$, each and via connecting terminal $q$ back to the current source $I_t$. The memory element $G_{23}$ in plane 1 is coupled with twice half the write current because the $z$-conductor does not convey current so that its direction of magnetization will match this current direction. The memory element $G_{23}$ in plane 2 is coupled in total with half the write current because the $z$-conductor conveys a current opposite that through the $x_2$- or $y_3$-conductor. The memory element $G_{23}$ in plane 2 will therefore not be able to adapt its direction of magnetization to the direction of half the write current. This method has the advantage that in the memory element $G_{23}$ the variations in the current passing through the $x_2$- or $y_3$-conductor are completely compensated for by the variations in the current passing through the $z_2$-conductor, since these currents are supplied from the same source.

In order to read the information the change-over switches $Sw_1$ and $Sw_2$ are changed over so that, when the current source $I_t$ supplies a current pulse, this pulse passes via connecting terminal $p$, switch $Sw_1$, the $y_3$-conductors in the planes 1 to $p$, the switch $Sy_3$, conductors $x_3$ in the planes $p$ to 1, switch $Sx_2$, switch $Sw_2$, via earth to the connecting terminal $q$ of the current source $I_t$. The current pulse thus passes through the $x_2$- and $y_3$-conductors in a direction opposite that during writing, whereas the $z$-conductor is not traversed by current. Thus all memory elements $G_{23}$ are fully energized in the read direction and the memory elements whose direction of magnetization changes induce an output voltage in read conductors (not shown) provided for each plane.

The storage device described above has the advantage that only one current source is employed so that the internal dissipation is very low. Setting the current strengths only requires adjustment or readjustment of said current source. The currents passing through the $x$-, $y$- and z-conductors are identical so that the tolerance is improved. The current source may be provided with a buffer in order to allow the use of a lower supply voltage, the dissipation being thus further reduced.

The over-all impedance of the z-conductors is high in a store having a large number of memory elements. This means that in order to obtain a given steepness of the current pulses a high supply voltage is required, which involves high internal dissipation in the current source.

Figure 2:
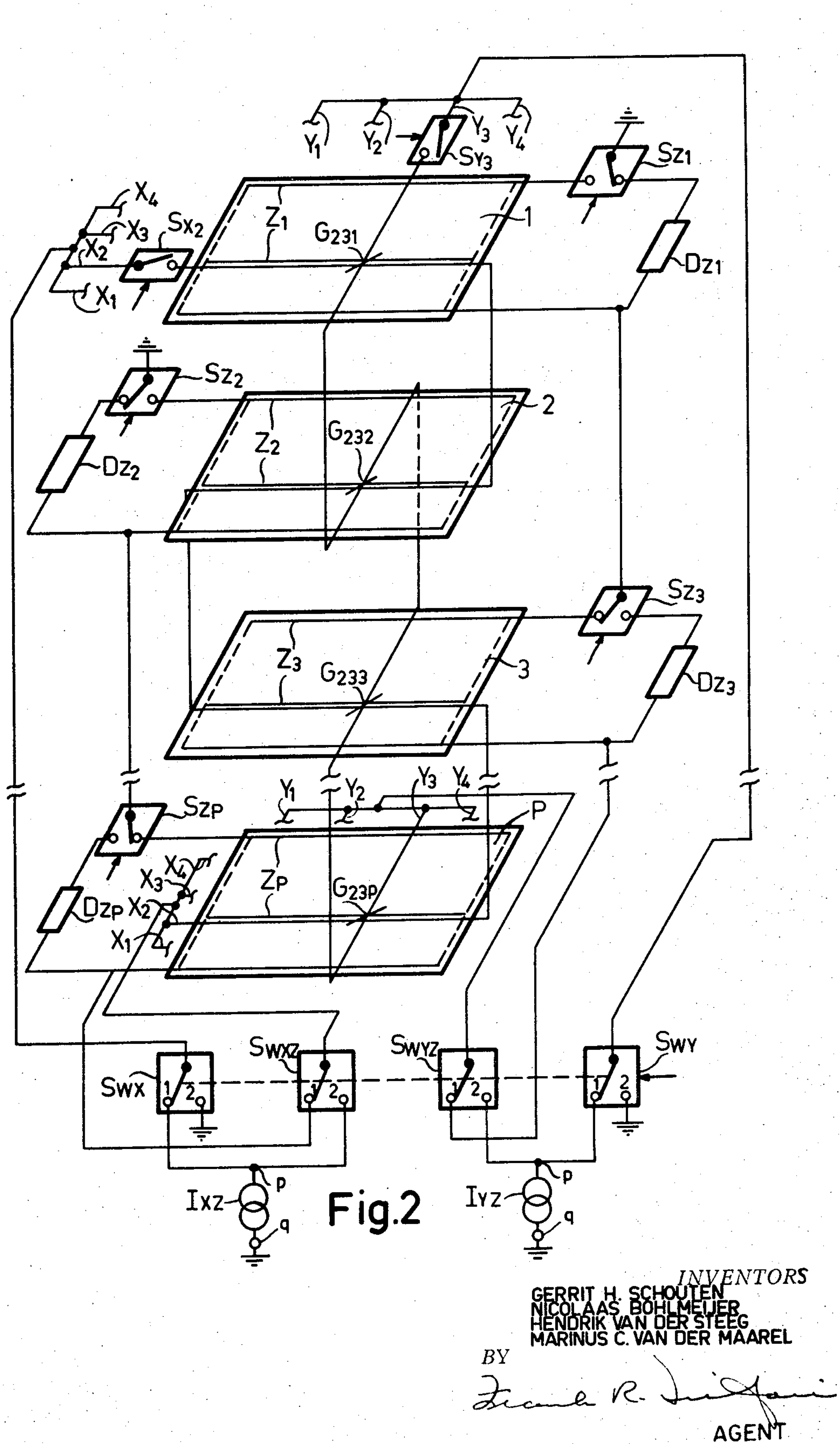

In the embodiment of a storage device shown in FIG. 2 in accordance with the invention this is obviated by using two current sources.

The store shown in this Figure comprises the same number of planes, the structure is the same in each plane and the $x$- and $y$-conductors of the various planes having the same indices are interconnected in the same manner as those of the store shown in FIG. 1. Hereinafter only the differences will be set out. FIG. 2 shows only the planes 1 to 3 and the plane $p$, it being assumed that p is an even number. The store comprises two current sources $Ix_z$ and $Iy_z$. The current source $Ix_z$ is connected by the connecting terminal $p$ to contact 2 of a change-over switch $Sw_x$ and to contact 1 of a change-over switch $Sw_x$, the switching arm of which is connected to one end of the parallel combination of the $x$-conductors having different indices of the series-connected $x$-conductors of the same indices, the other end being connected to the switching arm of the change-over switch $Sw_{xz}$. The contact 1 of the change-over switch $Sw_{xz}$ is connected to one end of the series combination of the $z$-conductors or their networks Dz of the even-numbered planes, the other ends of which are connected to earth. The contact 2 of switch $Sw_x$ and the connecting terminal $q$ of the current source $I_{xz}$ are connected to earth. Likewise the current source $I_{yz}$ is connected by the connecting terminal $p$ to contact 2 of a change-over switch $Sw_{yz}$ and to contact 1 of a change-over switch $Sw_y$, the switching arm of which is connected to one end of the parallel combination of the y-conductors of different indices of the series-connected y-conductors of equal indices, the other end being connected to the switching arm of the change-over switch $Sw_{yz}$. The contact 1 of the change-over switch $Sw_{yz}$ is connected to one end of the series combination of the z-conductors or their networks Dz of the odd-number planes, the other ends of which are connected to earth. The contact 2 of switch $Sw_y$ and the connecting terminal $q$ of the current source $I_{yz}$ are connected to earth. The switching arms of the change-over switches Sw are interconnected so that all switching arms are simultaneously in connection with contact 1 or contact 2 of the switches.

In order to write information the switches $Sw$ have to be put in position 1. The current source $I_{xz}$ then supplies a current equal to half the write current via switch $Sw_x$ in the position shown, switch $Sx_2$ in the closed position, the $x_2$-conductors of the planes 1 to $p$, switch $Sw_{xz}$ in the state shown, the $z$-conductor of plane p, the switch $S_{zp}$ in the state shown via the $z$-conductors or their networks Dz and the switches Sz of the even-numbered planes (not shown), the network $Dz_2$, switch $Sz_2$ in the state shown and earth to the connecting terminal $q$ of the current source $I_{xz}$. Likewise, the current source $I_{yz}$ supplies a current equal to half the write current via switch $Sw_y$ in the state shown, switch $Sy_3$ in the state shown, the $y_3$-conductors of the planes 1 to $p$, switch $Sw_{yz}$ in the state shown and via the $z$-conductors or the networks Dz and the switches Sz of the odd-numbered planes (not shown), the $z_3$-conductor, switch $Sz_3$ in the state shown, the network $Dz_1$, switch $Sz_1$ in the state shown and via earth to the terminal $q$ of the current source $I_{yz}$. In order to read the switches $Sw$ are put in position 2 so that half the wire current passes via contact $p$ of the current source $I_{xz}$, via switch $Sw_{xz}$ in the state not shown, the $x_2$-conductors in the planes $p$ to 1, switch $Sx_2$ in the closed state and switch $Sw_x$ in the state not shown via earth to the terminal $q$ of the current source $I_{xz}$. Likewise, half a write current will pass via contact $p$ of current source $I_{yz}$ via switch $Sw_{yz}$ in the state not shown, the $y_3$-conductors in the planes $p$ to 1, switch $Sy_3$ in the closed state and switch $Sw_y$ in the state not shown via earth to the terminal $q$ of the current source $I_{yz}$.

It will be apparent from the Figure that only the series-connected $z$-conductors of the even-numbered planes are connected in series with the $x$-conductors and connected to the current source $I_{xz}$ and that the series-connected $z$-conductors of the odd-numbered planes are connected in series with the $y$-conductors and to the current source $I_{yz}$. It is thus ensured that the impedance connected to the current sources amount to half those connected to the current source of FIG. 1, whilst the influence of half the write current through the $x$- or $y$-conductor connected to a memory element on said memory element is completely compensated for by a forbidding current passing through the $z$-conductor in accordance with the information, which conductor is coupled with said memory element. It is thus ensured that said additional advantages are maintained, whilst with regard to the known state of the art a considerable reduction of the number of current sources is achieved. Obviously the $z$-conductors may also be distributed in other groups, for example, the z-conductors of the planes 1 to $p/2$ and the $z$-conductors of the planes $(p/p2+1)$ to $p$.

Figure 3:
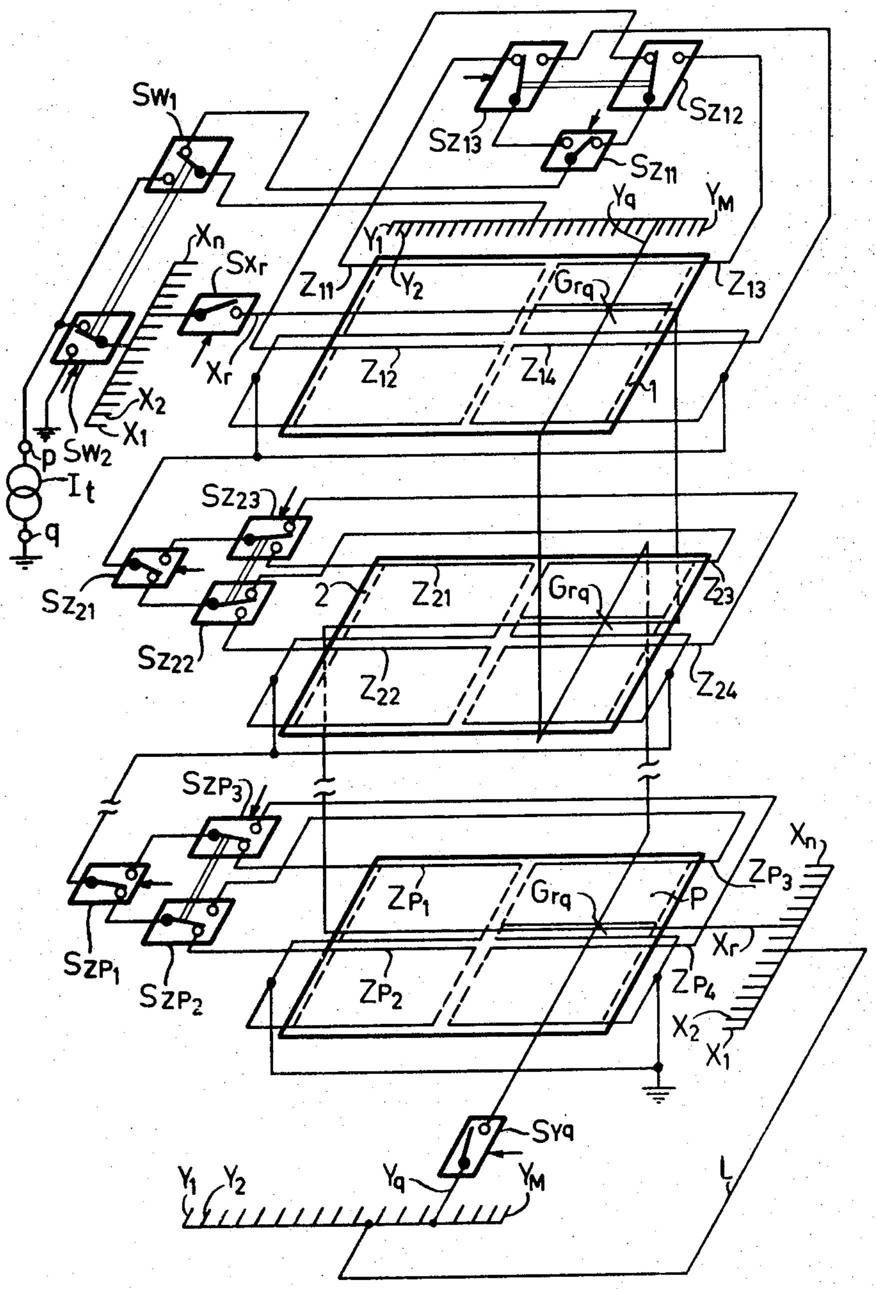

The embodiments shown in FIGS. 1 and 2 require a network Dz for each $z$-conductor. This requirement is obviated in the embodiment shown in FIG. 3. FIG. 3 shows a three-dimensional store, which does not require networks Dz. The configuration of this store comprising $p$ planes having $n \times m$ cores is largely identical to that of FIG. 1. Hereinafter only differences will be explained. By way of example, each plane comprises 4 $z$-conductors, each coupled with a different group of $n \times m$ memory elements. In plane 1 these $z$-conductors are designated by $z_{11}$, $z_{12}$, $z_{13}$ and $z_{14}$, in plane 2 by $z_{21}$, $z_{22}$, $z_{23}$ and $z_{24}$, etc. To each plane are added three switches for selecting a $z$-conductor. For plane 1 these are the switches $Sz_{11}$, $Sz_{12}$ and $Sz_{13}$, for plane 2 the switches $Sz_{21}$, $Sz_{22}$ and $Sz_{23}$, etc. These switches are arranged so that one $z$-conductor of each plane can be connected in series with a $z$-conductor of any other plane. According as writing of information in a memory element of a plane has to be passed or has not to be passed, the $z$-conductor coupled with the memory element or a $z$-conductor not coupled with the memory element is selected with the aid of said switches.

The operation of this store will be explained with reference to examples, which are concerned with writing and reading of information in the memory elements $Grq$. In order to write the information the switches $Sw_1$ and $Sw_2$ have to be in the state shown and the switches $Sx_r$ and $Sy_q$ have to be closed. The states shown of the switches Sz correspond to to information to be written. Thus a current circuit is completed via the connecting terminal $p$, the switches $Sw_2$, the switch $Sx_r$, the conductors $x_r$ in the planes 1 to $p$, the conductor 1, the conductor $y_q$ in the planes $p$ to 1, the switch $Sw_1$, the switch $Sz_{11}$, the switch $Sz_{12}$, the conductor $z_{12}$, the switch $Sz_{21}$, the switch $Sz_{23}$, the conductor $z_{23}$, etc. . . . the switch $Sz_{p1}$, the switch $Sz_{p2}$, the conductor $z_{p2}$, earth to the connecting terminal $q$. The current source $I_t$, connected to these terminals, conveys half a write current through said current circuit. The memory element $Grq$ of plane 1 is not coupled with the $z_{12}$ conductor through which the forbidding current is flowing. This memory element is therefore coupled with two half write currents passing through the conductors $x_r$ and $y_q$. The direction of magnetization of this memory element will match the direction of the write current.

The memory element $Grq$ of plane 2 is coupled not only with the half write currents through the $x_r$ and $y_q$ conductors but also with the forbidding current through the $z_{23}$ conductor. The over-all current coupled with this memory element has the value of half the write current and is therefore not capable of adapting its direction of magnetization to the sense of the write current. In accordance with the states of the switches Sz in the other planes the same considerations apply to the memory elements $G_{rq}$ in said planes as to the memory elements $G_{rq}$ in the planes 1 and 2. To the memory element $G_{rq}$ of plane $p$ for example, applies the same as to the memory element of plane 1, that is to say, that by passing the forbidding current through a $z$-conductor $z_{p2}$ not coupled with the memory element this memory element will adapt its direction of magnetization to the sense of the write current.

Reading of information is performed in the same manner as described with reference to FIG. 1. The switches $Sw_1$ and $Sw_2$ have to be set in the other state than that shown.

An additional advantage of this store as compared with that shown in FIG. 2 is that each of the $z$-conductors is coupled with only one quarter of the number of memory elements in each plane, so that the impedance of these $z$-conductors in this embodiment is reduced to one quarter. It should be noted that a further reduction of the impedance of the $z$-conductors can be achieved by coupling each of the $z$-conductors with still fewer memory elements. For this purpose the number of $z$-conductors for each plane has to be increased accordingly. Moreover, as in the embodiment of FIG. 2 two current sources may be used. By these measures a lower supply voltage will suffice for obtaining current pulses having predetermined flank steepness. During the reading process the magnetization will decrease in these memory elements whose directions of magnetization are opposite those associated with the sense of half the write current during reading, which elements are not coupled with the forbidding current through the $z$-conductor during any preceding write periods of information in the other memory elements, since the hysteresis loop is not perfectly rectangular. As a result interference voltages are induced in the read wire, which interference voltages are termed "delta noise voltages."

In the store shown in FIG. 3 the currents through the $x$-, $y$- and $z$-conductors are identical and the current through the $z$-conductor is coupled with the memory elements in a sense opposite that of the current through the $x$- and $y$-conductors. The memory elements coupled with a current-conveying $x$-conductor as well as with a current conveying $z$-conductor or with a current-conveying $y$-conductor and a current-conveying z-conductor will therefore not experience any change in the direction of magnetization. In the store shown in FIG. 3 a forbidding current is always conveyed through one quarter of all memory elements in one plane independently of the information so that in practice a lower "-delta noise voltage" is obtained. A further reduction of the "delta noise" is found to be obtainable in practice by joining the $z$-conductors pairwise so that, when writing in a memory element coupled with one of the $z$-conductors of one pair a forbidding current is passed through this $z$-conductor or through the other $z$-conductor of the pair.

Figure 4:
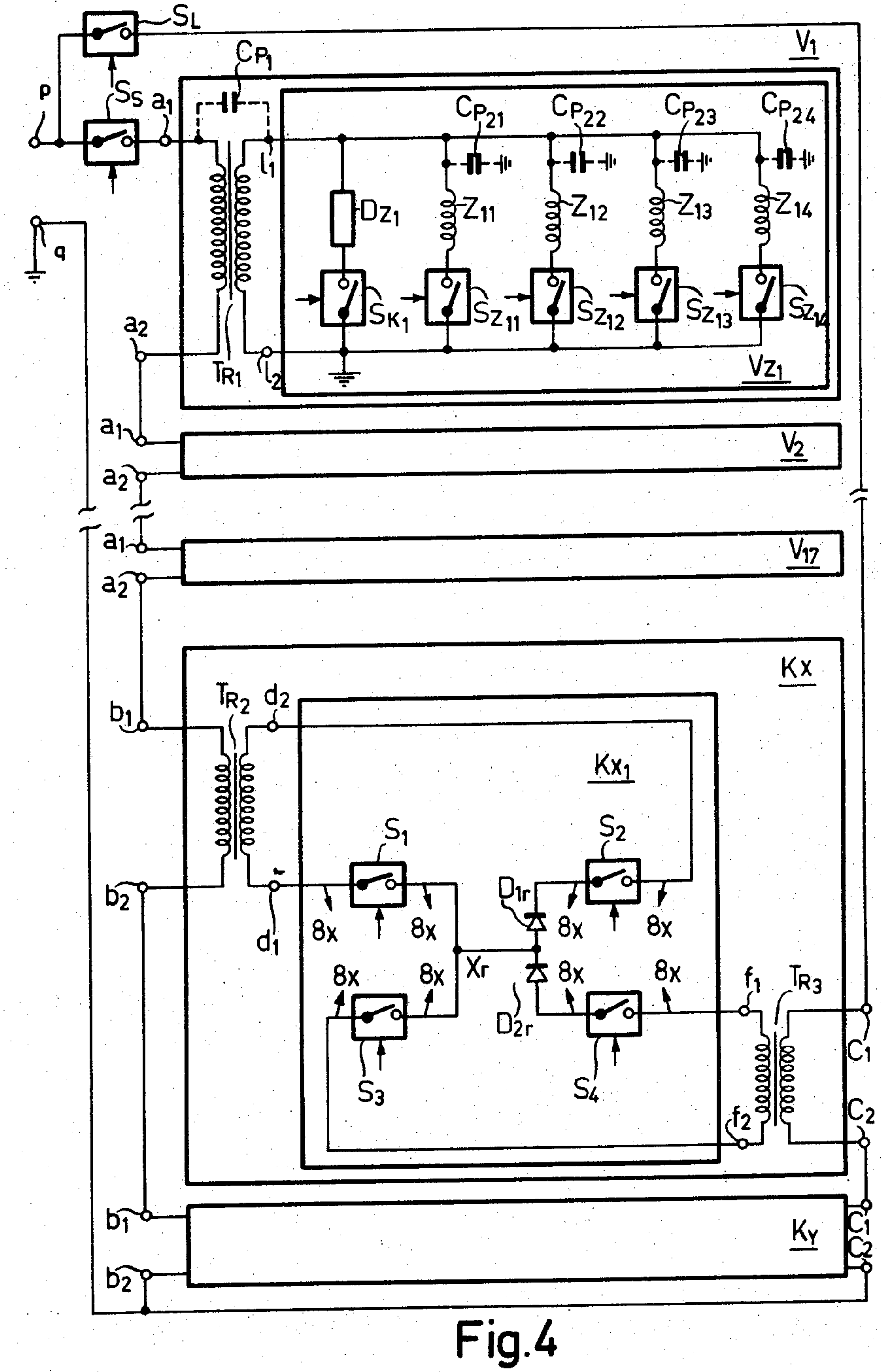
FIG. 4, 5 and 6 show basic diagrams of stores embodying the invention comprising different transformer couplings between the current source and the conductors.
Figure 5:
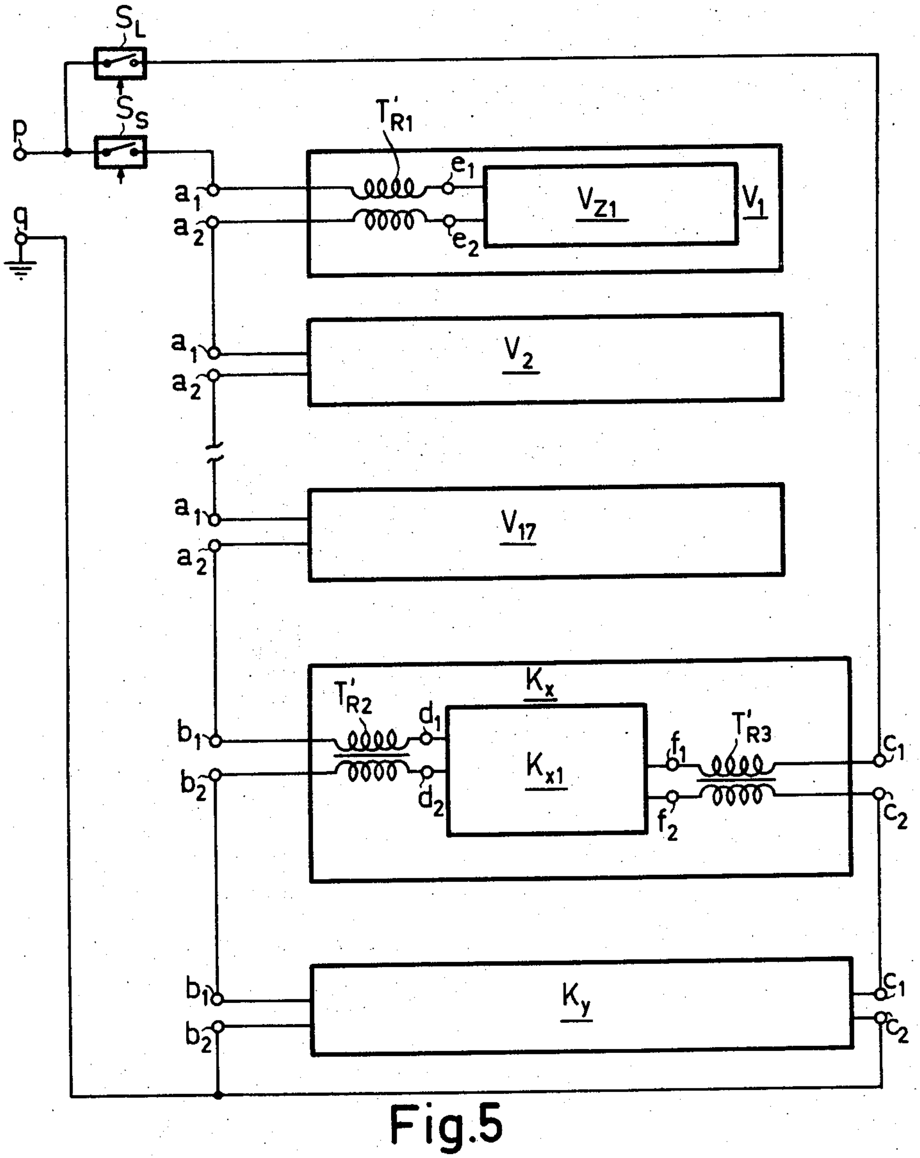
Figure 6:
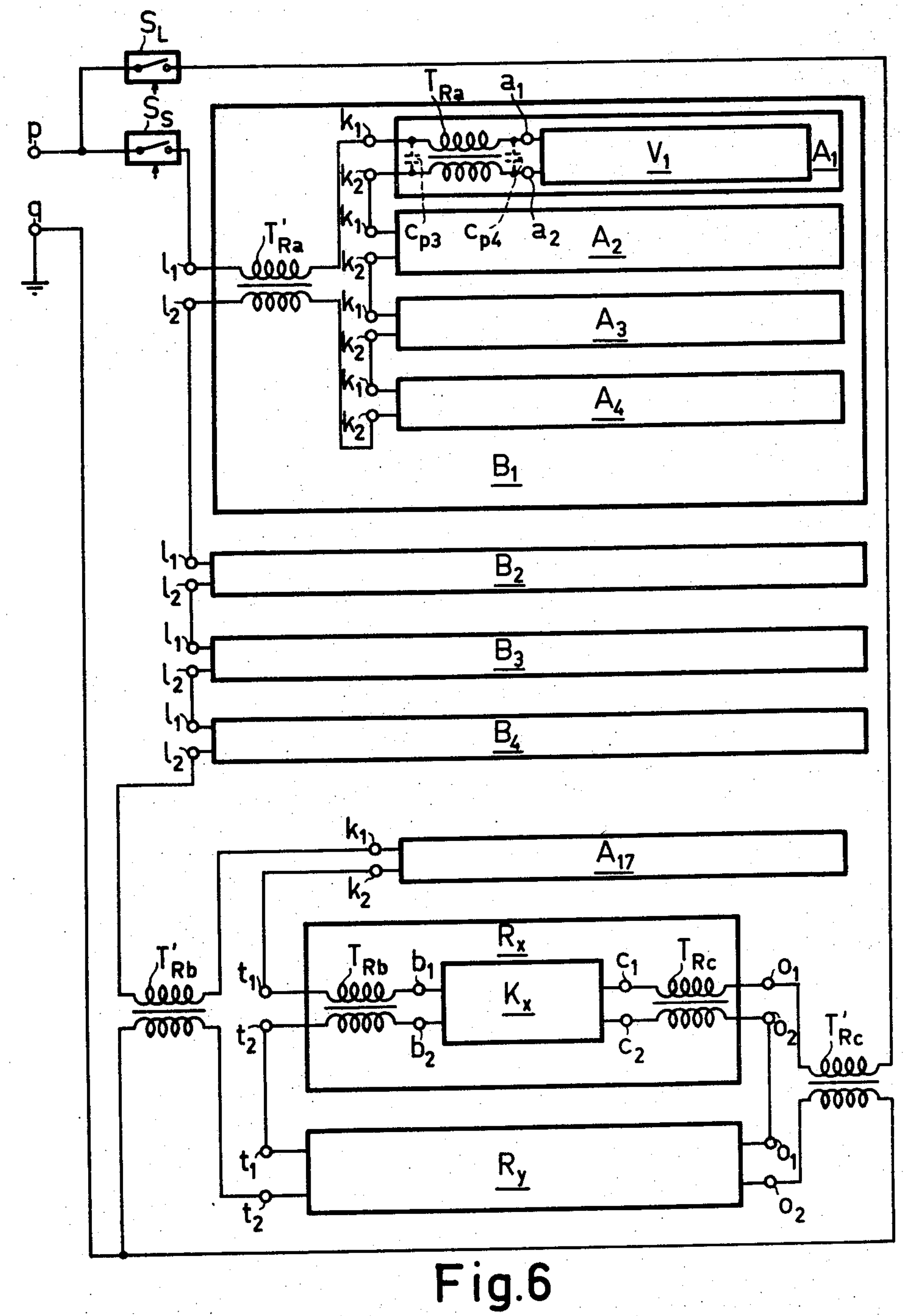

Wiring capacitances are present between the conductors located in the same planes and in the different planes. When the current source is switched on, they produce capacitive currents which adversely affect particularly the rising time of the current pulses through the conductors. Because the $x$-, $y$- and $z$-conductors are connected in series, the wiring capacitances will also give rise to current differences between the relative conductors, when the current source is switched on. FIGS. 4, 5 and 6 show a few embodiments of arrangements for the series connection of the $x$-, $y$- and $z$-conductors, in which the influence of stray capacitances is reduced.

FIG. 4 shows schematically the arrangement of the $x$-, $y$- and $z$-conductors, of a store of the kind shown in FIG. 3, which comprises, by way of example, 17 planes and having in each plane memory elements arranged in 64 rows and 64 columns. The circuitry of the $z$-conductors of plane 1 is shown in the Figure in a block $Vz_1$, from which two conductors emanate whose ends $l_1$ and $l_2$ may be considered to form the connecting terminals of the block $Vz_1$. Between the terminals $l_1$ and $l_2$ are connected in parallel the four $z$-conductors of plane 1:$z_{11}$, $z_{12}$, $z_{13}$ and $z_{14}$, each of which includes a switch $Sz_{11}$, $Sz_{12}$, $Sz_{13}$ and $Sz_{14}$ respectively. If only one $z$-conductor is available in each plane, the relevant $z$-conductor, in this case that of plane 1, has connected to it the series combination of a network $Dz_1$ having a switch $Sk_1$. The connecting terminals $l_1$ and $l_2$ of the block $Vz_1$ are connected to the secondary winding of a transformer $Tr_1$, the ends $a_1$ and $a_2$ of the primary winding being considered to form the connecting terminals of a block $V_1$ comprising the block $Vz_1$ and the transformer $Tr_1$. The circuitry of the $z$-conductors of the other planes 2 to 17 is represented in the Figure by the blocks $V_2$ to $V_{17}$, each of them being identical in structure to the block $V_1$. The arrangement of the 64 $x$-conductors is shown in the Figure in a block $Kx_1$, from which four conductors emanate, the ends $d_1$, $d_2$ and $f_1$, $f_2$ of which may be considered to form two pairs of connecting terminals of said block.

The connecting terminal $d_1$ is connected to 8 first connecting terminals of 8 switches $S_1$ and the connecting terminal $d_2$ is connected to 8 first connecting terminals of 8 switches $S_2$. The Figures show only one switch $S_1$ and one switch $S_2$. The total number of 8 switches $S_1$ and $S_2$ is indicated by arrows in the Figure. Between two connecting terminals of each pair of switches $S_1$ and $S_2$ is arranged the series combination of an $x$-conductor with an individually adjoined first diode $D_1$, whose cathode is connected to the second connecting terminal of the switch $S_2$. Of the 64 $x$-conductors with individual adjoined first diodes only the conductor $x_r$ and the diode $D1_r$ are shown. The terminal $f_1$ has connected to it eight first connecting terminals of eight switches $S_4$ and the terminal $f_2$ eight first connecting terminals of eight switches $S_3$. The second connecting terminal of each switch $S_3$ is connected to the second connecting terminal of one of the switches $S_1$. The second terminal of each switch $S_4$ is connected to the anodes of eight second diodes $D_2$ adjoined individually to x-conductors connected to different switches $S_2$. The cathode of each these second diodes is connected to the anode of the relevant first diode. The Figure shows only one of the switches $S_3$, switches $S_4$ and diodes $D_2$.

The connecting terminals $d_1$ and $d_2$ of block $Kx_1$ are connected to the secondary winding of a transformer $Tr_2$. The connecting terminals $f_1$ and $f_2$ of this block are connected to the secondary winding of a transformer $Tr_3$. The ends $b_1$ and $b_2$ of the primary winding of the transformer $Tr_2$ and the ends $c_1$ and $c_2$ of the primary winding of transformer $Tr_3$ may be considered to form the connecting terminals of a block $Kx$ including the block $Kx_1$ and the transformers $Tr_2$ and $Tr_3$. The arrangement of the y-conductors is represented in the Figures by block $Ky$, which is constructed in the same manner as the block $Kx$. The connecting terminals $a_1$ and $a_2$ of the blocks $V_1$ to $V_{17}$ and the connecting terminals $b_2$ and $b_1$ of the blocks $Kx$ and $Ky$ are all connected in series and via switch $S_s$ to the terminals $p$ and $q$ of the current source (not shown). The connecting terminals $c_1$ and $c_2$ of the blocks $Kx$ and $Ky$ are connected in series and via switch $S_L$ to the terminals $p$ and $q$ of the current source (not shown).

In order to write information the $x$- and $y$-conductors coupled with a group of memory elements have to be selected by closing one of the switches $S_1$ and of the switches $S_2$ both in the circuitry of block $Kx$ and in that of the block $Ky$ and in accordance with the information to be written one of the switches $Sz$ or the switch $Sk$ has to be closed in each of the blocks $V_1$ to $V_{17}$. By closing the switch Ss a current will pass via a connecting terminal $p$, switch $Ss$, the primary winding of the transformers $Tr_1$ of the blocks $V_1$ to $V_{17}$ and the primary winding of transformers $Tr_2$ of the blocks $Kx$ and $Ky$ to the terminal $q$. This current induces currents of the strength of half the write current in the secondary windings of transformers $Tr_1$ and $Tr_2$. Each of these currents will flow back via the connecting terminal $l_2$ and the closed switch $Sz$ or $Sk$ via the $z$-conductor or the network $Dz$ associated with said closed switch to the terminal $l_1$. Half the write current through the secondary winding of the transformer $Tr_2$ of the blocks $Kx$ or $Ky$ will pass via the connecting terminal $d_1$, the closed switch $S_1$, and $x$- or an $y$-conductor respectively and the first diode $D_1$ included therein and the closed switch $S_2$ to the connecting terminal $d_2$.

In order to read information from a group of memory elements, the $x$- and $y$-conductors coupled with said group of memory elements have to be selected by closing one of the switches $S_3$ and one of the switches $S_4$ both in the circuitry of the block $Kx$ as in the circuitry of the block $Ky$. By closing the switch $S_L$ a current will pass via connecting terminal $p$, the switch $S_L$, the network $D_{zt}$, the primary windings of the transformers $Tr_3$ of the blocks $Kx$ and $Ky$ to the connecting terminal $q$. This current induces a current of the strength of half the write current in the secondary winding of transformer $Tr_3$. This current will flow via the connecting terminal $f_1$, the closed switch $S_4$, the selected x- and y-conductors with any diode $D_2$ associated herewith, the closed switch $S_3$ to the connecting terminal $f_2$ of the transformer $Tr_3$ so that this current passes through the x- and y-conductors in a sense opposite that of the write current.

Since, the x-, y and z-conductors are coupled via transformers with the supply circuit, the voltages of these conductors to earth can float and the stray capacitances of the current source are decoupled. Across each of the primary windings of the transformers Tr a voltage drop occurs and because they are connected in series, each winding has a different voltage to earth. These voltages are each operative across the series combination of the wiring capacitances between the primary and secondary windings of the relevant transformers Tr and indicated in the Figure at transformer $Tr_1$ by $c_{p1}$ in block $V_1$ and the capacitances of the conductors to earth are indicated in the Figure for the various z-conductors of plane 1 by $c_{p21}$, $c_{p22}$, $c_{p23}$ and $c_{p24}$ in block $V_{z1}$. The potential of each of the conductors in the various blocks will adjust itself to the voltage of this capacitive voltage divider so that between the blocks high voltage differences may occur, whilst via the mutual stray capacitances of the blocks capacitative currents may flow. By connecting the secondary side of the transformer Tr to earth, as is indicated in the Figure for the block $Vz_1$, no higher voltage differences can occur between the blocks than the voltages across the secondary windings of the transformers Tr. Thus the magnitude of the capacitative currents between the conductors is considerably reduced. Moreover, the earth-connection of the secondary sides of the transformers has the advantage that the switches Sz, Sk, $S_1$ and $S_2$ are connected to earth on one side so that the switches may be formed by grounded-emitter transistors so that the response voltages of the bases of all transistors are the same. These transistors may be controlled by a simple control-device.

By connecting the secondary windings of transformers Tr to earth, the full voltages are operative across the capacitances $c_{p1}$ between the primary and secondary windings of transformers Tr. These capacitances are then charged by currents passing via earth to the terminal q of the current source (not shown). This results in that the memory elements in the various planes are coupled with unequal currents during the rising time of the current pulses. FIG. 5 shows a variant of the circuit arrangement shown in FIG. 4, in which the currents passing via earth are drastically reduced by the use of balance-unbalance transformers.

FIG. 5 shows the identical blocks $V_1$ to $V_{17}$ and the identical blocks Kx and Ky. The block $Vz_1$ in block $V_1$ and the corresponding blocks not shown in the blocks $V_2$ to $V_{17}$ are constructed as shown in FIG. 4. Also block $Kx_1$ in block Kx and the corresponding block not shown in block Ky are arranged as shown in FIG. 4. In the arrangement shown in FIG. 5 the terminals $e_1$ and $e_2$ of block $Vz_1$ are connected to one side of the primary and secondary windings respectively of a transformer $Tr_1'$. The terminals $a_1$ and $a_2$ of block $V_1$ are connected to the other side of the primary and secondary windings respectively.

The terminals $d_1$ and $d_2$ of block $Kx_1$ are connected to one side of the primary and secondary windings respectively of transformer $Tr_2'$. The terminals $d_1$ and $d_2$ of block Kx are connected to the other side of the primary and secondary windings of said transformer. The terminals $f_1$ and $f_2$ of block $Kx_1$ are connected to one side of the primary and secondary windings of a transformer $Tr_3'$. The terminals $c_1$ and $c_2$ of block Kx are connected to the other side of the primary and secondary windings respectively of said transformer.

The terminals $a_1$ and $a_2$ of the blocks $V_1$ to $V_{17}$ and the terminals $b_1$ and $b_2$ of the blocks Kx and Ky are all connected in series with each other and via switch Ss to the terminals p and q of the current source (not shown). The terminals $c_1$ and $c_2$ of the blocks Kx and Ky are connected in series with each other and via switch $S_L$ to the connecting terminals p and q of the current source (not shown).

When writing information half the write current passes via connecting terminal $a_1$ of block $V_1$, the primary winding of transformer $Tr_1$ and connecting terminal $e_1$ to the circuitry of the block $Vz_1$ and via connecting terminal $e_2$, the secondary winding of transformer $Tr_1'$, the connecting terminal $a_2$ of block $V_1$ to earth. Half the write current will traverse in the same manner the circuitries of the blocks $V_2$ to $V_{17}$. Half the write current passes furthermore via connecting terminal $b_1$ of block Kx, the primary winding of transformer $Tr_2'$, the connecting terminal $d_1$ of block $Kx_1$, the circuitry of block $Kx_1$, the connecting terminal $d_2$ of block $Kx_1$, the secondary winding of transformer Tr' *and the connecting terminal* $b_2$ of block Kx and the circuitry of block Kx. Half the write current also passes the circuitry of block Ky in the same manner.

In reading the forbidding current will pass via connecting terminal $c_1$ of block Kx, the primary winding of transformer $Tr_3'$, connecting terminal $f_1$ of block $Kx_1$, the circuitry of block $Kx_1$, the connecting terminal $f_2$ of block $Kx_1$, the secondary winding of transformer $Tr_3'$ and the connecting terminal $c_2$ of block Kx, the circuitry of block Kx. Also the circuitry of block Ky is traversed in the same manner by the forbidding current.

The balance-unbalance transformers constitute an inductance for current differences between the primary and secondary windings.

The strength of the capacitative currents leading to current differences, when the current source is switched on, for example, the currents passing to earth via the earth capacitances of the z-conductors is reduced. The steepness of the current pulses through the conductors is thus affected to a lesser extent by the presence of the stray capacitances. The inductance of the balance-unbalance transformers can, however, not be raised arbitrarily. Therefore, in practice during switching on of the current source some amount of charging currents of stray capacitances will flow.

In order to obtain a short rising time of the current pulses, the current source, which is loaded, when switched on, by the impedances of the series-connected conductors apparently forming inductances, is constructed so that the voltage at the output terminals p and q is considerably higher during the starting time for overcoming the counter-voltages produced by said inductances than during the peak of the current pulse.

Thus high voltage, when the current source is switched on, leads to an increase in capacitative currents, which counteract the reduction of switching-on time aimed at in the arrangements shown in FIGS. 4 and 5. In order to obtain very short switching-on times it may be desirable to further reduce the influence of the stray capacitances. FIG. 6 shows a solution for this problem.

The arrangements of the $z$-conductors of plane 1 and of all $x$-conductors are shown in this Figure by the blocks $V_t$, $k_x$, the arrangements thereof being identical to the corresponding blocks of FIG. 4.

The connecting terminal $a_1$ of the circuitries of block $V_1$ is connected to one side of the primary winding of a transformer $Tr_a$ and the connecting terminal $a_2$ is connected to one side of the secondary winding of said transformer $Tr_a$. The other ends $k_1$ and $K_2$ of the primary and secondary windings respectively of transformer $Tr_a$ may be considered as the connecting terminals of a block $A_1$ including the block $V_1$ and transformer $Tr_a$. The arrangement of the $z$-conductors of planes 2 to 4 and of plane 17 is represented in the Figure by the blocks $A_2$ to $A_4$ and $A_{17}$, each being constructed like the block $A_1$. The connecting terminals $k_1$ and $k_2$ of the blocks $A_1$ to $A_4$ are connected in series with each other and connected on one side to one side of the primary winding of a transformer $Tr_a'$ and on the other side to one side of the secondary winding of said transformer. The other ends $l_1$ and $l_2$ of the transformer $Tr_a'$ may be considered to form the connecting terminals of one of the blocks $A_1$ to $A_4$ and of the block $B_1$ including the transformer $Tr_a'$. The arrangements of the $z$-conductors of the planes 5 to 8, 9 to 12 and 13 to 16 are represented in the Figure by the blocks $B_2$ to $B_4$, each being identical to block $B_1$.

The connecting terminal $b_1$ of the circuitry of block $Kx$ is connected to one side of a primary winding of transformer $Tr_b$ and the connecting terminal $b_2$ is connected to one side of the secondary winding of said transformer. Likewise the connecting terminal $c_1$ of the circuitry of block $Kx$ is connected to one side of the primary winding of transformer $Tr_c$ and the connecting terminal $c_2$ is connected to one side of the secondary winding of said transformer. The other connecting terminals $t_1$ and $t_2$ of transformer $Tr_b$ and the other connecting terminals $o_1$ and $o_2$ of the transformer $Tr_c$ may be considered to form the connecting terminals of a block $Rx$ including the block $Kx$ and the transformers $Tr_b$ and $Tr_c$. The arrangement of the $y$-conductors is represented in the Figure by a block $Ry$, which is identical to the block Rx. The terminals $k_1$ and $k_2$ of the block $A_{17}$ and the terminal $t_1$ and $t_2$ of the blocks Rx and Ry are connected in series with each other, one end being connected to one end of the primary winding of a transformer $Tr_b'$ and the other end to one end of the secondary winding of said transformer. The other ends of the windings of said transformers are connected in series with the connecting terminals $l_1$ and $l_2$ of the series-connected blocks $B_1$ to $B_4$ via a switch $Ss$, connected to the terminals $p$ and $q$ of a current source (not shown). The terminals $o_1$ and $o_2$ of the blocks $Rx$ and $Ry$ are connected in series with each other and connected at one end to one end of the primary winding of a transformer $Tr_o'$ and by the other end to one end of the secondary winding of said transformer. The other ends of the windings of said transformer are connected via switch $S_L$ to the terminals $p$ and $q$ of the current source (not shown).

By this arrangement it is ensured that the currents of the wiring capacitances $C_{p1}$ between the primary and secondary windings of the transformers $Tr_1$ of the blocks V and of the transformers $Tr_2$ and $Tr_3$ of the blocks $Kx$ and $Ky$ must flow via the balance-unbalance transformers $Tr_a$, $Tr_b$ and $Tr_c$ respectively, which form inductances for these currents. Moreover, the currents of four series-connected blocks, for example, $A_1$ to $A_4$, are passed through the balance-unbalance transformer $Tr_a'$ so that the difference current occurring in every four blocks has again to pass through an inductance. This also applies to the arrangements of the blocks $B_2$ to $B_4$, which are identical to block $B_1$. The currents through the series-connected circuitries of the block $A_{17}$ and the currents of the blocks Rx and Ry passing through the connecting terminals $t_1$ and $t_2$ are passed through the balance-unbalance transformer $Tr_b'$. The currents of the blocks Rx and Ry passing through the terminals $o_1$ and $o_2$ are passed through the balance-unbalance transformer $Tr_c'$.

Thus, again an inductance for the difference currents passing through said transformers originating from not completely compensated capacitative currents is included for compensating for said currents.

By correct choice of all transformers it can be avoided that the wiring and earth capacitances of the conductors and of the transformers $Tr_1$ to $Tr_3$ are charged during the switching-on time to an extent exceeding the voltage associated with the peak of the current pulse so that the advantage is obtained that no high charging and discharging currents will appear.

The charging currents of the wiring capacitances between the primary and secondary windings of the balance-unbalance transformers — FIG. 6 showing only the wiring capacitances $Cp_3$ and $Cp_4$ of transformer $Tr_a$ of block $A_1$ — do not produce a difference in current strengths neither through the primary and secondary windings of themselves nor through those of other balance-unbalance transformers connected to the former.

Figure 7:
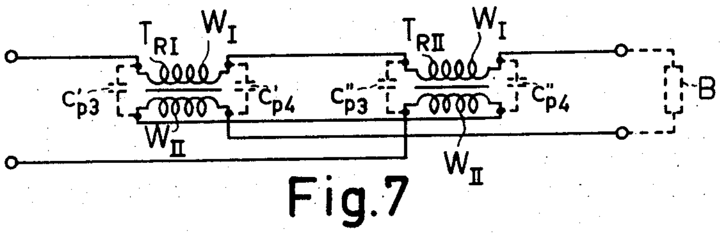
FIG. 7 shows a double balance-unbalance transformer coupling.

These capacitances are therefore rapidly charged and discharged and will be capable of following the voltage peaks occurring during the switching-on time. By replacing each balance-unbalance transformer in FIGS. 5 and 6 by the arrangement shown in FIG. 7, the charging currents of the stray capacitances between the windings of the balance-unbalance transformers are reduced and their charging time is prolonged. The arrangement shown in this Figure comprises two balance-unbalance transformers $Tr_I$ and $Tr_{II}$ connected in series that a current circuit is formed in the order: primary winding $W_I$ of transformer $Tr_I$, primary winding $W_I$ of transformer $Tr_{II}$, via a load B, secondary winding $W_I$ of transformer $Tr_I$, secondary winding $W_{II}$ of transformer $Tr_{II}$. It is thus ensured that the capacitative currents of the capacitances $Cp_3'$ and $Cp_4'$ of transformer $Tr_I$ behave like a difference between currents through the primary and secondary windings of transformer $Tr_{II}$, whilst the capacitative currents of the wiring capacitances $Cp_3''$ and $Cp_4''$ of transformer $Tr_{II}$ behave like a difference between currents through the primary and secondary windings of transformer $TR_I$. This arrangement has the advantage that the capacitances between the primary and secondary windings of the balance-unbalance transformers are charged via inductances.

What is claimed is:

1. A storage device comprising magnetic memory elements coupled each with an $x$, a $y$- and a $z$-conductor, the $x$- and $y$-conductors each including selection switches coupling said conductors to a write current source, said current source further supplying a counteracting current of half the strength required for writing information in said memory element, switching means responsive to the selection of a memory element associated therewith in accordance with the information to be recorded for connecting said $z$-conductor of each memory element in series in opposite senses with one of the conductors of the group formed by the $x$- and $y$-conductors of said memory element, and means for applying to said $z$-conductor simultaneously with the write current, said counteracting current of half the write current from said current source through said 2-conductor.

2. A storage device as claimed in claim 1, wherein upon the selection of a memory element whose $z$-conductor must not carry a forbidding current during writing, said one conductor of the group formed by the $x$- and $y$-conductors of the memory element is connected in series with a network whose impedance is equal to that of the z-conductor.

3. A storage device as claimed in claim 2, wherein said storage device comprises a plurality of magnetic elements arranged in a plurality of planes, each of said planes made up of said memory elements arranged in a plurality of columns and rows, the memory elements being coupled to each column of each plane with said $x$-conductor and in each row of each plane with said $y$-conductor, characterized in that in each plane said $z$-conductor is provided in common for a group of memory elements and in that for a network is coupled to each common 2-conductor, said network having an impedance equal to that of the common $z$-conductor.

4. A storage device as claimed in claim 3 characterized in that in each plane a plurality of identical groups of memory elements are coupled each with a common z-conductor and in that said network is formed by a z-conductor coupled with a further group of memory elements.

5. A storage device as claimed in claim 4 characterized in that the $x$-, $y$-and $z$-conductors are coupled to their current sources through transformer couplings.

6. A storage device as claimed in claim 5 characterized in that the conductors are coupled via a first transformer coupling with one of a group of current circuits common to a plurality of conductors, said current circuits each being coupled with their current source via a second transformer.

7. A storage device as claimed in claim 5 characterized in that at least one of the transformer couplings comprises a balance-unbalance transformer.

8. A storage device as claimed in claim 7 characterized in that at least one of the transformer couplings comprises two balance-unbalance transformers connected so that a current supplied from the current source passes through the primary winding of one of the transformers, the primary winding of the other transformer, the secondary winding of one transformer and the secondary winding of the other transformer in that order.

* * * * *